United States Patent
Kanjirathinkal et al.

(10) Patent No.: US 9,626,414 B2
(45) Date of Patent: Apr. 18, 2017

(54) AUTOMATIC LOG RECORD SEGMENTATION

(71) Applicant: International Business Machines Corporation, Armonk, NY (US)

(72) Inventors: Rose Catherine Kanjirathinkal, Bangalore (IN); Sriram Raghavan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 185 days.

(21) Appl. No.: 14/252,107

(22) Filed: Apr. 14, 2014

(65) Prior Publication Data
US 2015/0293920 A1   Oct. 15, 2015

(51) Int. Cl.
*G06F 17/30* (2006.01)
*G06F 3/048* (2013.01)
*H04L 29/06* (2006.01)

(52) U.S. Cl.
CPC .......... *G06F 17/3053* (2013.01); *G06F 3/048* (2013.01); *G06F 17/30144* (2013.01); *G06F 17/30584* (2013.01); *G06F 17/30616* (2013.01); *H04L 63/14* (2013.01)

(58) Field of Classification Search
CPC ......... G06F 17/30106; G06F 17/30979; G06F 17/30368; G06F 17/3053; G06F 17/30144; G06F 17/30584; G06F 17/30616; Y10S 707/966; Y10S 707/99931; H04L 63/14
USPC ........................................................ 707/748
See application file for complete search history.

(56) References Cited

U.S. PATENT DOCUMENTS

| | | | | |
|---|---|---|---|---|
| 5,878,414 A * | 3/1999 | Hsiao | ................ | G06F 17/30368 707/648 |
| 7,827,148 B2 * | 11/2010 | Mori | ................... | G06F 19/3412 607/29 |
| 7,890,511 B2 * | 2/2011 | Valimaki | ............. | G06F 17/3089 707/737 |
| 7,912,946 B2 * | 3/2011 | Sengupta | ............... | G06Q 10/10 709/223 |
| 8,577,829 B2 | 11/2013 | Subrahmanyam et al. | | |
| 8,620,928 B1 * | 12/2013 | Walton | ................ | G06F 17/3053 707/748 |
| 2005/0172162 A1 * | 8/2005 | Takahashi | ........... | G06F 11/0709 714/4.4 |
| 2005/0251381 A1 * | 11/2005 | Pentheroudakis | .. | G06F 17/2725 704/4 |

(Continued)

OTHER PUBLICATIONS

Pei, Jian et al., "PrefixSpan: Mining Sequential Patterns Efficiently by Prefix-Projected Pattern Growth," The International Council for Open and Distance Education (ICDE), Proceedings of the 17th International Conference on Data Engineering, Apr. 2-6, 2001, pp. 215-224, Heidelberg, Germany, IEEE Digital Library.

(Continued)

*Primary Examiner* — Thanh-Ha Dang
(74) *Attorney, Agent, or Firm* — Ference & Associates LLC (57) ABSTRACT

Methods and arrangements for segmenting log records. A log file is received. Candidates for a sequential pattern within the log file are automatically discerned, and, for each candidate, a likelihood is estimated that it represents a boundary within the log file. Other variants and embodiments are broadly contemplated herein.

18 Claims, 7 Drawing Sheets

(56) References Cited

U.S. PATENT DOCUMENTS

| | | | |
|---|---|---|---|
| 2006/0184529 A1* | 8/2006 | Berg | G06F 11/0709 |
| 2006/0195297 A1* | 8/2006 | Kubota | G06F 17/30861 |
| | | | 702/187 |
| 2008/0091486 A1* | 4/2008 | Aoyama | G06Q 10/10 |
| | | | 705/7.42 |
| 2008/0260121 A1* | 10/2008 | Chin | H04M 3/2272 |
| | | | 379/93.07 |
| 2008/0294740 A1* | 11/2008 | Grabarnik | G06F 11/0709 |
| | | | 709/206 |
| 2009/0193111 A1* | 7/2009 | Sengupta | G06Q 10/10 |
| | | | 709/224 |
| 2009/0193112 A1* | 7/2009 | Sengupta | G06F 11/28 |
| | | | 709/224 |
| 2010/0011031 A1* | 1/2010 | Huang | H04L 63/1408 |
| | | | 707/E17.007 |
| 2010/0306363 A1* | 12/2010 | Saputra | H04L 67/06 |
| | | | 709/224 |
| 2011/0113287 A1* | 5/2011 | Gururaj | G06F 11/0766 |
| | | | 714/37 |
| 2013/0097125 A1 | 4/2013 | Marvasti et al. | |
| 2013/0171960 A1* | 7/2013 | Kandregula | G06F 11/3013 |
| | | | 455/405 |
| 2013/0311994 A1* | 11/2013 | Jung | G06F 17/30539 |
| | | | 718/100 |
| 2013/0325829 A1* | 12/2013 | Agarwal | G06F 17/30008 |
| | | | 707/703 |
| 2014/0006010 A1* | 1/2014 | Nor | G06F 17/2282 |
| | | | 704/9 |
| 2014/0222843 A1* | 8/2014 | Sareen | H04L 67/1097 |
| | | | 707/755 |
| 2015/0220605 A1* | 8/2015 | Syed | G06F 11/30 |
| | | | 707/776 |

OTHER PUBLICATIONS

Li, Chun, et al., "Efficient Mining of Gap-Constrained Subsequences and Its Various Applications," Transactions on Knowledge Discovery from Data (TKDD), Mar. 2012, 39 pages, vol. 6, Issue 1, Article 2, ACM Digital Library.

Tan, Jiaqi, et al., "SALSA: Analyzing Logs as StAte Machines," USENIX Workshop on the Analysis of System Logs (WASL) 2008 (marked with an asterisk), 9 pages, available at https://www.usenix.org/legacy/event/wasl08/tech/full_papers/tan/tan.pdf, Accessed on Mar. 24, 2014.

Xu, Wei, et al., "Detecting Large-Scale System Problems by Mining Console Logs," Proceedings of the ACM SIGOPS 22nd Symposium on Operating Systems Principles (SOSP' 09), Oct. 11-14, 2009, Big Sky, MT, USA, 15 pages, ACM Digital Library.

Embley, D.W., et al., "Record-Boundary Discovery in Web Documents," Proceedings of the 1999 ACM SIGMOD International Conference on Management of Data (SIGMOD '99), Jun. 1999, pp. 467-478, Philadelphia, PA, USA, ACM Digital Library.

Chang, Chia-Hui, et al., "IEPAD: Information Extraction Based on Pattern Discovery," Proceedings of the 10th International Conference on World Wide Web (WWW '01), May 1-5, 2001, pp. 681-688, Hong Kong, Hong Kong, ACM Digital Library.

Liu, Bing, et al., "Mining Data Records in Web Pages," Proceedings of the Ninth ACM SIGKDD International Conference on Knowledge Discovery and Data Mining (SIGKDD '03), Aug. 24-27, 2003, 6 pages, Washington, DC, USA, ACM Digital Library.

\* cited by examiner

AUTOMATIC LOG RECORD SEGMENTATION

BACKGROUND

Assimilating and analyzing a large amount of computer log data, as normally stored in computer log files, each of which normally includes a number of log records, can often be tremendously important in isolating and solving any problems that may arise with a computer system. Given the richness of the data involved, any information derived may be of use in root cause analysis, general problem resolution and preventative maintenance.

Conventionally, log analytics tools include log parsers configured for one or more known log formats but normally are inadequate for covering a large range of log formats. This can present a particular challenge if log entries are application-dependent, especially when any single system or machine may well incorporate a very diverse number and type of applications (owing, e.g., to the preponderance of open source and free software). Some tools permit a user to specify regular expressions or other expressions in a given language (e.g., AQL), but this is of little benefit for users who may not have a working familiarity with such a language.

BRIEF SUMMARY

In summary, one aspect of the invention provides a method of segmenting log files, said method comprising: utilizing at least one processor to execute computer code configured to perform the steps of: receiving a log file; automatically discerning candidates for a sequential pattern within the log file; and for each candidate, estimating a likelihood that it represents a boundary within the log file.

Another aspect of the invention provides an apparatus for segmenting log records, said apparatus comprising: at least one processor; and a computer readable storage medium having computer readable program code embodied therewith and executable by the at least one processor, the computer readable program code comprising: computer readable program code configured to receive a log record; computer readable program code configured to automatically discern candidates for a sequential pattern in the log file; and computer readable program code configured to estimate, for each candidate, a likelihood that it represents a boundary within the log file.

An additional aspect of the invention provides a computer program product for segmenting log records, said computer program product comprising: a computer readable storage medium having computer readable program code embodied therewith, the computer readable program code comprising: computer readable program code configured to receive a log record; computer readable program code configured to automatically discern candidates for a sequential pattern within the log file; and computer readable program code configured to estimate, for each candidate, a likelihood that it represents a boundary within the log file.

A further aspect of the invention provides a method comprising: receiving a log file comprising a plurality of records; tokenizing at least a portion of the log file to produce tokens; generating a sequence from the tokens, for review in said discerning of candidates for a sequential pattern; automatically discerning candidates for a sequential pattern within the log file; and for each candidate, estimating a likelihood that it represents a boundary between log records within the log file.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Broadly contemplated herein, in accordance with at least one embodiment of the invention, are methods and arrangements which permit the automatic segmentation of log files into individual records, to assist in log analytics, and to do so in a manner that is essentially "blind" or agnostic to the log format being used.

Thus, in accordance with at least one embodiment of the invention, an objective involves finding regularity in an input log file towards automatically segmenting the same. To this end, tokens and terms may be generalized by way of improving precision. Of assistance in this regard is a recognition that, in a preponderance of cases, values are output here instead of labels, given that the logs tend to be machine generated.

Figure 1:
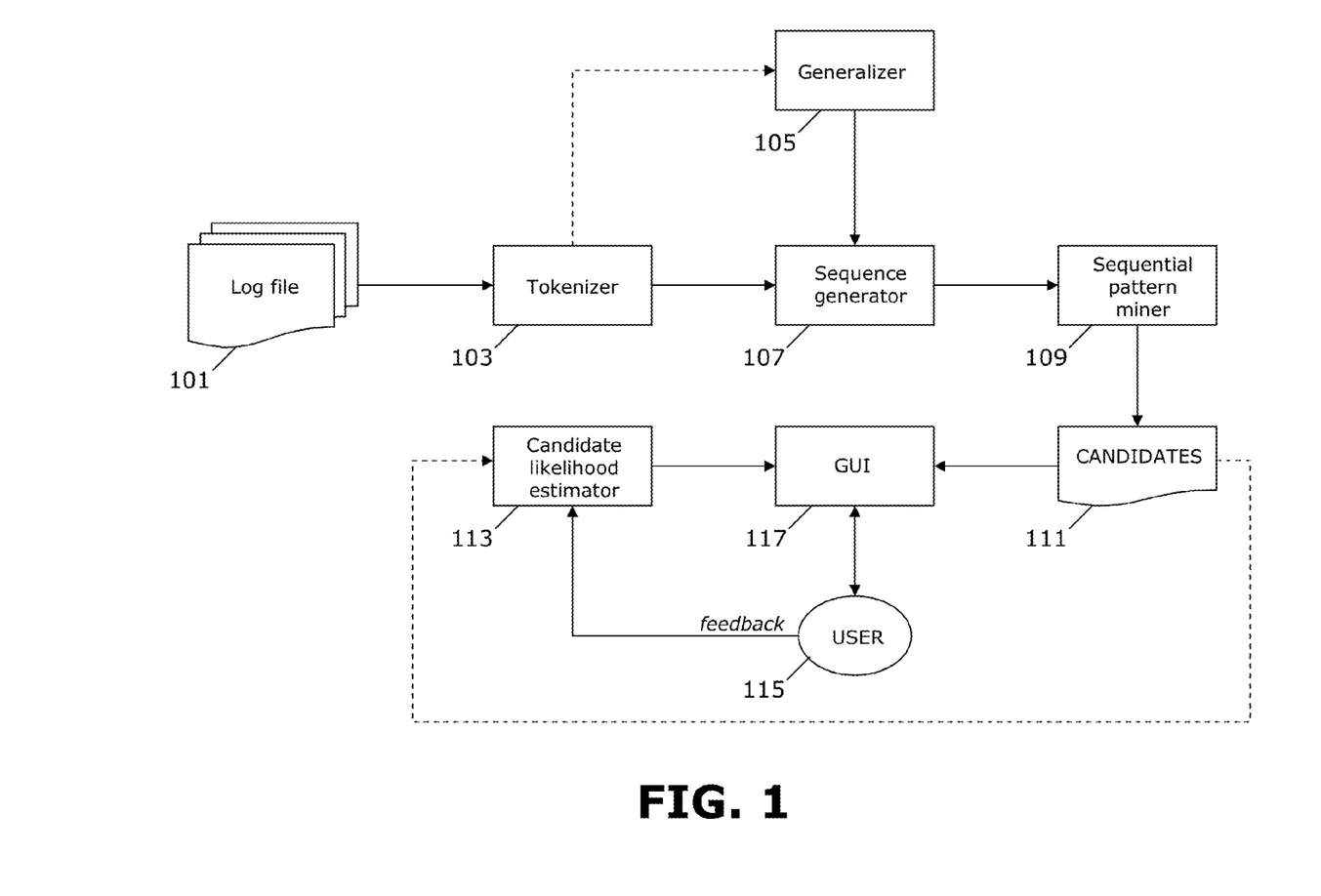
FIG. 1 schematically illustrates a process of automatic log segmentation.

FIG. 1 schematically illustrates a process of automatic log segmentation, in accordance with at least one embodiment of the invention. It will be appreciated that certain steps of log segmentation are undertaken automatically, without user input or intervention. Such steps, indicated at 103, 105, 107 and 109 in FIG. 1, at least may be configured towards automatically discerning candidates for a sequential pattern in the log file, whereupon such candidates (111) may then be displayed to a user for further feedback.

As shown, in accordance with at least one embodiment of the invention, an input log file 101 is first fed to a tokenizer 103. The log file 101 contains multiple log records, and the tokenizer 103 serves to output a list of tokens. The tokens may be generic, or may employ domain information and, depending on the strategy used, may or may not preserve delimiter tokens in the output.

In accordance with at least one embodiment of the invention, a heuristic strategy may be employed for tokenizing. Thus, in an example of a strategy where tokenizing is performed on all non-alphanumeric characters, input containing "LABEL: ECH_PING_FAIL_BCKP" may yield nine tokens: LABEL, :, ECH, _, PING, _FAIL, _, BCKP. In another strategy, annotators may be used in a manner (domain dependent or not) to focus on identifying strings that represent cohesive entities, and can avoid breaking up the input into a large number of tokens. By way of example, breakup of a single word into multiple tokens can be avoided. Thus, in an example of a strategy using the same input as mentioned above, "ECH_PING_FAIL_BCKP" can be designated as an identifier, and the three resultant tokens may be: LABEL, :, ECH_PING_FAIL_BCKP.

In accordance with a variant embodiment of the invention, a combined heuristic and annotating strategy may be used in tokenizing. This could well involve applying an annotator first to obtain larger "chunks", followed by a break-up of these into smaller "chunks" via the heuristic method. In another variant, multiple annotators and multiple heuristics (or at least one annotator combined with at least one heuristic) may be used while tokenizing. Here, there could be a strategy for handling cases where portions of input fulfill more than one rule (e.g., according to an annotator or heuristic). In this strategy, a "tiebreaking" step could be involved to determine which token(s) should be preserved; in an illustrative example, a longest token applying to a given string, as determined from two or more methods or rules (e.g., via at least one annotator and at least one heuristic) could be preserved.

In accordance with at least one embodiment of the invention, the tokens are generalized via a generalizer 105. Here, an objective involves improving accuracy by generalizing tokens or terms deriving from the log file 101. More particularly, since logs tend to be machine-generated, only values tend to be output or provided with the log file 101, and not their labels. (In other words, inasmuch as a server or other automated entity writes or outputs to a log file, they often are not intended for review by uninitiated users and thus may be sparse in terms of detail that would assist an untrained eye. For example, instead of an entry that could guide an uninitiated/untrained user with some labeling, e.g., "date=03/24/2014, type=warning, message=cannot contact server", a log entry might merely state "03/24/2014, warning, cannot contact server", without labels.) In the absence of labels, a pattern mining module may not be able to find repeating patterns. In other words, without labels a log file may wholly lack any apparent regularity and it then might be helpful to generalize some values towards a standardizing representation that could help in the establishment and detection of regularity.

As such, in accordance with at least one embodiment of the invention, generalizer 105 may employ any of a variety of strategies. In a character-level strategy, labels are applied with respect to characters; thus, e.g., all digits and their combinations could be replaced with the token, "NUM", and/or all alphanumeric tokens may be replaced with the token, "ALPHANUMERIC". In an entity-based strategy, if an entity annotator is available, a token or group of tokens can be replaced with an entity name. Thus, by way of example, "6/10/12 2:48:27:803 MDT" can be replaced with the token "DATE", and "00000003" can be replaced with the token "THREADID". Here "DATE" is an example of a domain-generic annotation while "THREADID" is an example of a domain-specific annotation. In another strategy, a hierarchy of generic classes may be applied wherein, given a token, a number of generic versions of the token may be applied. By way of an example, generic tokens for "3891" could include QUOTED_TEXT, 4_DIGIT_NUM, NUM and/or TEXT. If a less generic token is chosen, then an increase in the precision of a boundary pattern (as will be appreciated more fully below) can be ensured, thereby reducing false hits. However, a less generic token may not be easily repeatable.

Figure 2:
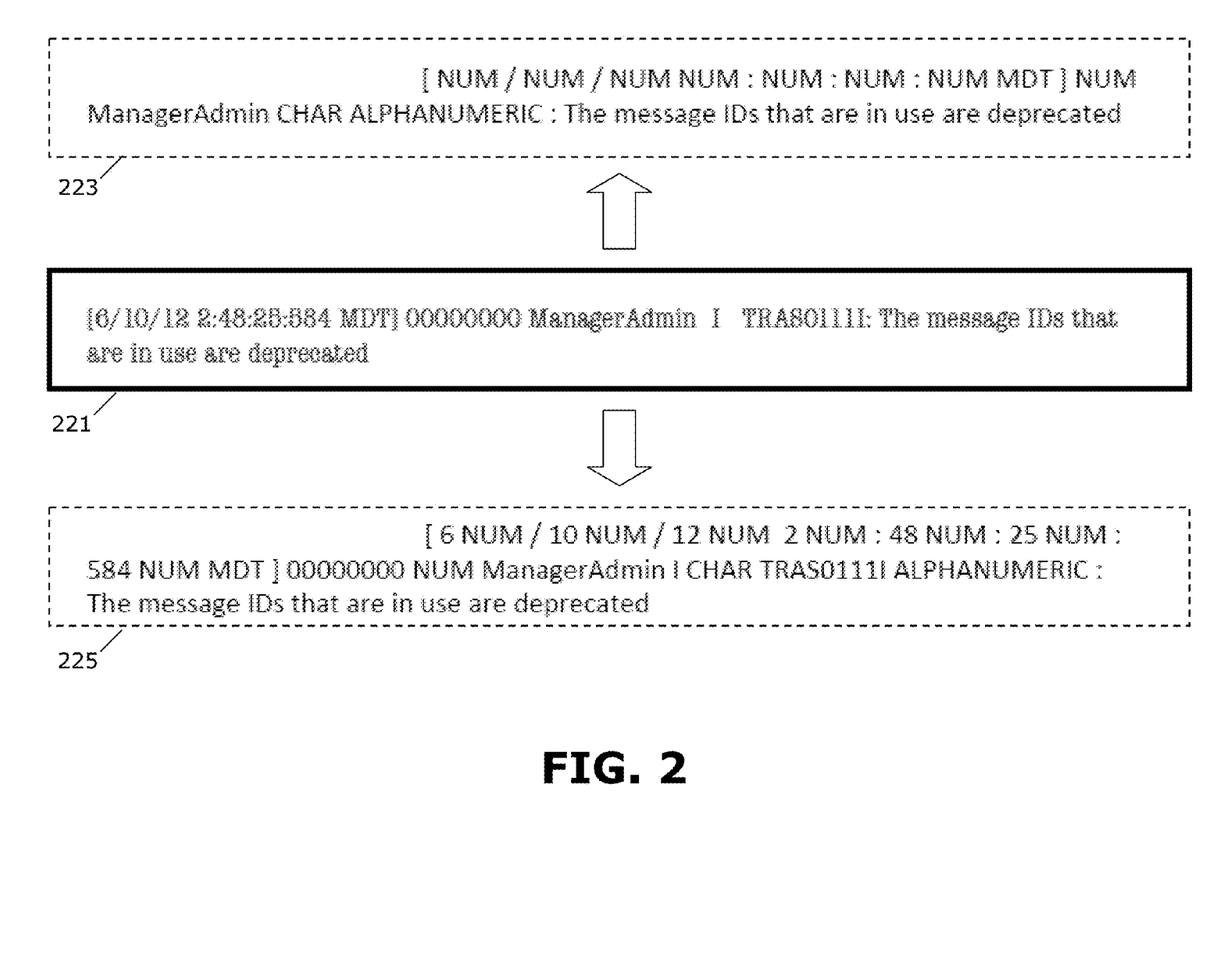
FIG. 2 schematically illustrates a pair of sequence generation strategies.

In accordance with at least one embodiment of the invention, a sequence generator 107 is then used to generate a sequence with the tokens. Thus here, given the original input 101, each line in that file will now yield a sequence based on input from tokenizer 103 and generalizer 105. FIG. 2 schematically illustrates a pair of sequence generation strategies. In one sequence generation strategy, starting with tokenized (and possibly generalized) input 221, all tokens can be replaced with a generic version whenever available (223). In another strategy, both the exact text and its generalized version from the input 221 can be retained, while preserving order information (225).

Returning now to FIG. 1, with sequences now generated, in accordance with at least one embodiment of the invention, a sequential pattern miner 109 runs an algorithm on all the sequences for the file in question, wherein each sequence represents a transaction and each token (or generalized token) within the sequence represents an ordered item of that transaction. Thus, given a set of ordered sequences, frequent sub-sequences are discerned. As a general rule, items of the sub-sequences may appear in a given order within a reasonably large number of input sequences, while consecutive items in the sub-sequence may not appear as consecutive in the input sequence (i.e., the sequence that has been received from the sequence generator). Essentially any suitable sequential pattern mining algorithm may be employed here. Illustrative examples of such algorithms may be found, for background purposes in: Pei et al., "PrefixSpan: Mining Sequential Patterns Efficiently by Prefix-Projected Pattern Growth", *In Proc. the 17th International Conference on Data Engineering (ICDE)*, 2001; and Li et al., "Efficient Mining of Gap-Constrained Subsequences and Its Various Applications", *ACM Transactions on Knowledge Discovery from Data (TKDD)*, 2012.

Figure 3:
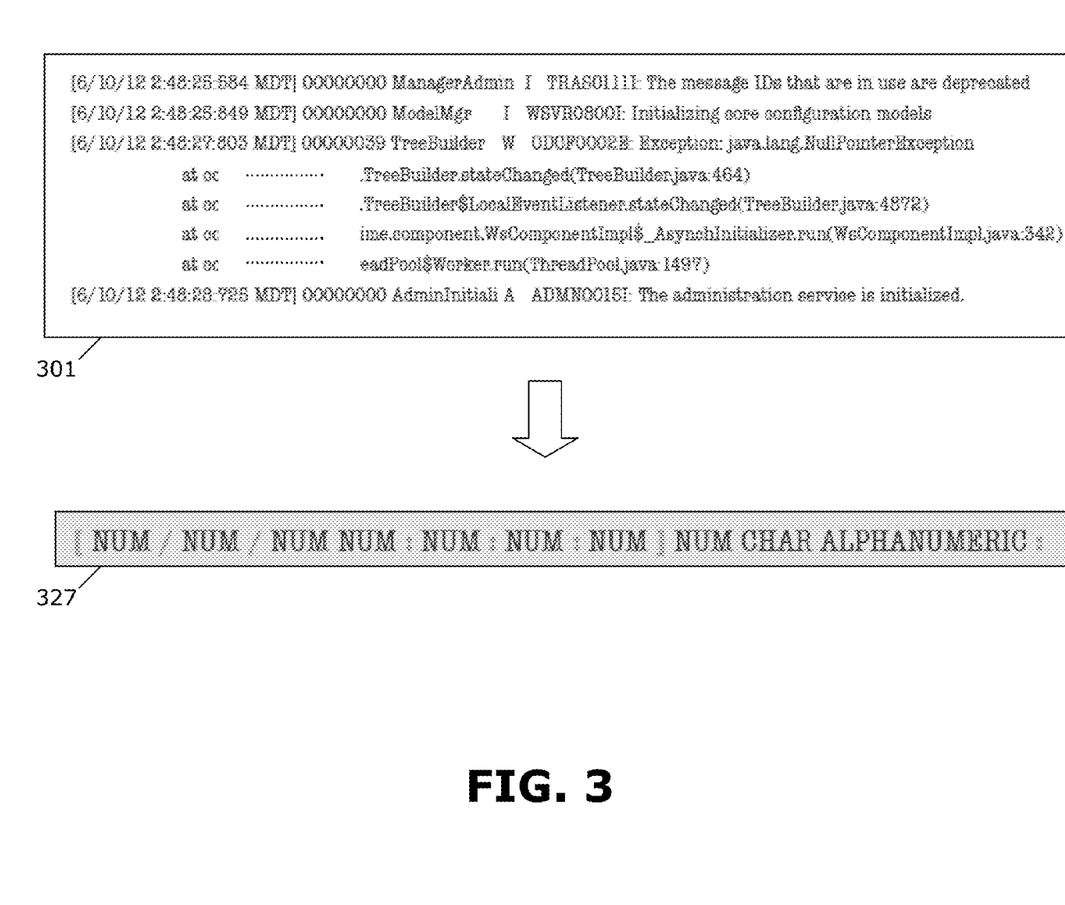
FIG. 3 schematically illustrates an example of sequential pattern mining.

FIG. 3 schematically illustrates an example of sequential pattern mining, in accordance with at least one embodiment of the invention. Input 301 contains several entries (each beginning with "[6/10 . . . "). After steps of tokenizing, generalizing and sequence generation have taken place (e.g., in manner as discussed herein with relation to components 103, 105 and 107), a sequential pattern miner (e.g., as indicated at 109 in FIG. 1) will output discovered pattern 327. In this pattern 327, "NUM", "CHAR" and "ALPHA-NUMERIC" represent generalized tokens, while "[", "/", ":" and "]" represent actual tokens. Though a wide range of implementations are possible, in the present example tokenizing involved designating all non-alphanumeric characters as delimiters (and then preserving the delimiters without generalizing), generalizing involved a character-level strategy, and sequence generation involved a strategy such as that indicated at 225 in FIG. 2 (retaining both the exact text and its generalized version while preserving order information).

Returning again to FIG. 1, it can be appreciated, in accordance with at least one embodiment of the invention, that it is possible for multiple candidates for discovered sequential patterns to be discerned. Several reasons could account for this, including false hits and/or hits on different parts of a template for a multi-line log record. Accordingly, given a set of candidate sequences 111 for the definition of boundaries between entries, the candidates can be ranked in order of their likelihood of representing a boundary. Thus, in a manner now to be appreciated, a candidate likelihood estimator 113, potentially with the assistance of feedback from a user 115 employing a graphical user interface (GUI) 117, can be employed to determine estimates of such likelihood.

Thus, in accordance with at least one embodiment of the invention, there are different approaches that may be adopted by a candidate likelihood estimator 113. In a heuristic approach, estimation of likelihood can relate to an order of occurrence; e.g., if different parts of the same template are candidates for boundary definition, then the candidate that matches the first line of the original input 101 is most likely to represent a boundary. Since dates often occur at the beginning of a log record, the presence of a date entry in the pattern can represent a candidate boundary. If free text is present in a candidate pattern, it could be recognized that free text often comes towards the end of a record. Secondary testing may be employed with candidates. In such a case, by way of example, a likely candidate may support a variance in the length of log records to the extent it is tested in segmenting the file.

In accordance with at least one embodiment of the invention, in a supervised approach for candidate likelihood estimation, a classifier can be trained such that input features are constructed from one or more heuristic approaches such as those just mentioned. Examples of such classifiers include SVM (support vector machine) and CRF (conditional random field) classifiers.

In accordance with at least one embodiment of the invention, user feedback, via a user 115 working with a GUI 119, can be employed to select from among candidates outright or to refine an automated method such as the heuristic and supervised approaches just described. In other words, given raw or processed input originating from the sequential pattern miner 109 and the candidates 111 produced thereby, user 115 can make a final determination as to the location of a boundary between log records. Such information can then be captured and reused among different log types, formats and even users, to further enhance and refine the automated processes being employed thereby.

Figure 4:
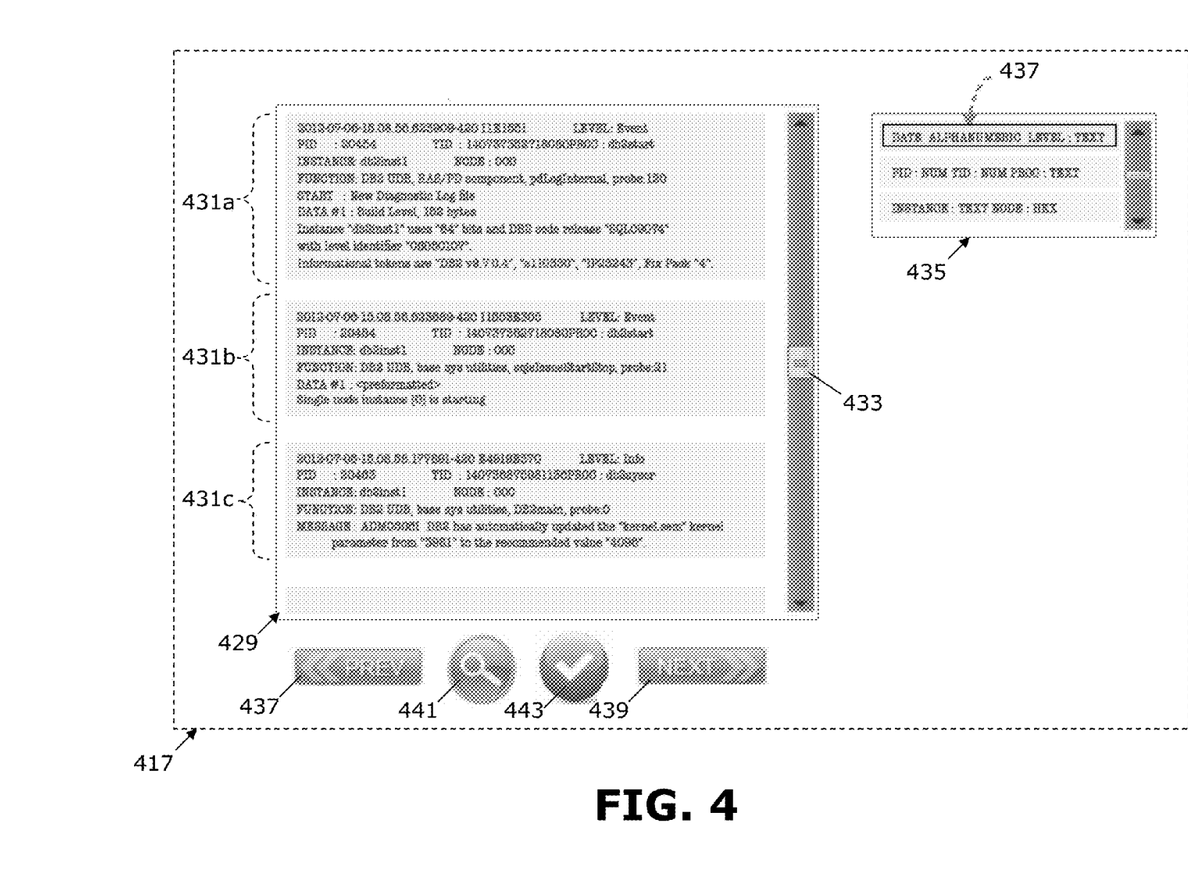
FIG. 4 sets forth an example of a graphical user interface (GUI) screen which may be employed in user-assisted candidate likelihood estimation.

FIG. 4 sets forth an example of a graphical user interface (GUI) screen 417 which may be employed in user-assisted candidate likelihood estimation. As shown therein, a main screen 429 can depict a segmented view of the original log file; here, there are separated segments 431a/b/c visible, though a slider 433 can be used to scroll up or down to other segments within the file. In a separate menu 435, there is a list of all boundary pattern candidates in ranked order, and the user may select and highlight any one (e.g., the first one as indicated at 437); the pattern so selected then governs segmentation of the log file on the main screen 429. (Should there be a quantitative tie in the ranked order, then a tiebreaker, e.g., alphabetical order, may be applied in finalizing the displayed order in menu 435.) Through available buttons below the main screen 429, a previous (437) or next (439) boundary pattern candidate (with respect to the ranked list in menu 435) can be selected, or a currently appearing candidate can be reviewed more closely (441) or confirmed (443). If confirmed (443), the separation between segments in main screen 429 would be established as a final, segmented separation between records of the log file for any desired further use.

Figure 5:
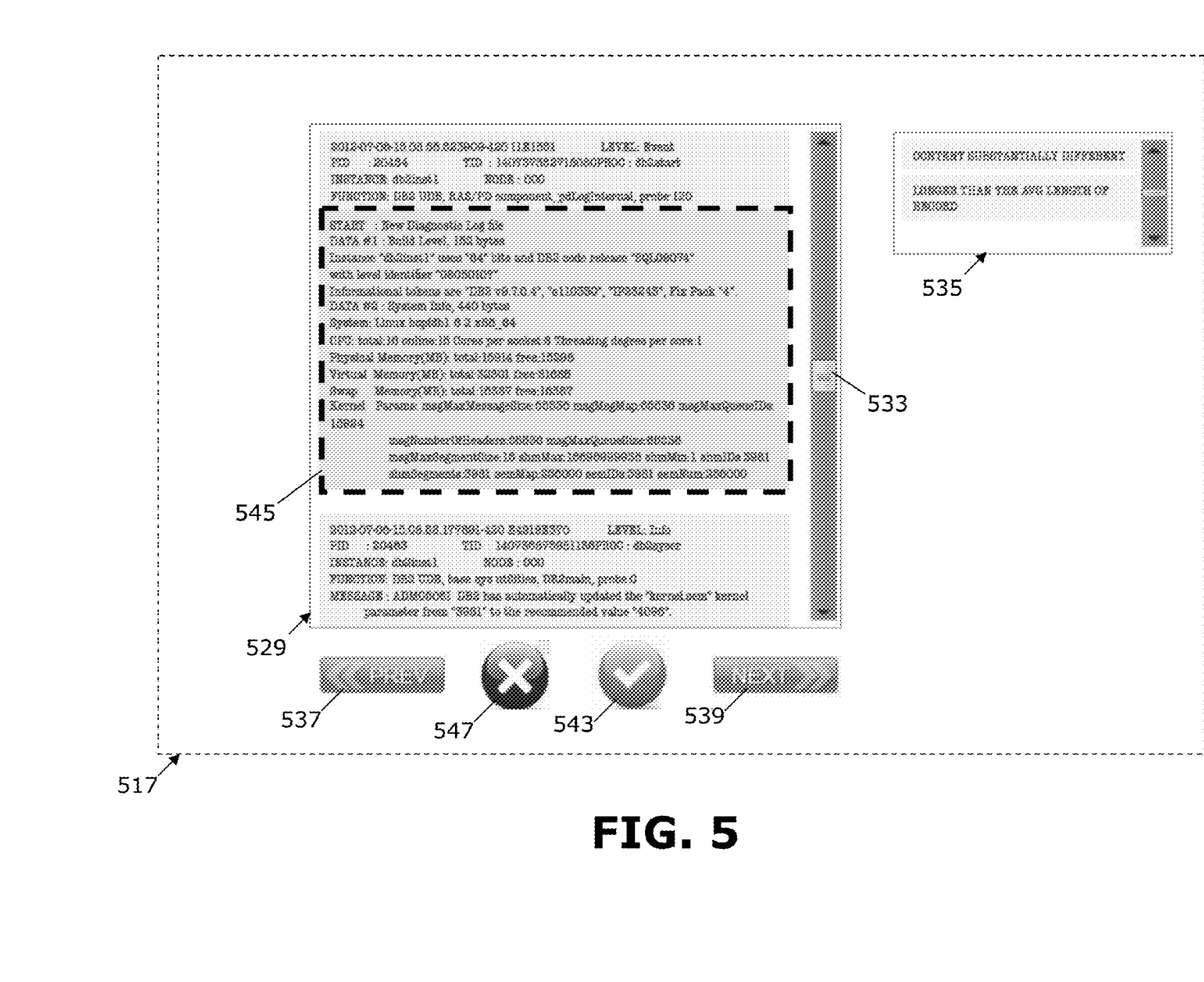
FIG. 5 sets forth an example of a review screen for a GUI.

FIG. 5 sets forth an example of a reviewing arrangement for a GUI 517, in accordance with at least one embodiment of the invention. Thus, if a candidate (for separating records of a log file) selected for closer review (e.g., via button 441 from FIG. 4), as indeed shown here, anomalous regions of one or more log records may be highlighted (e.g., parts of the log file where a log record is determined to be sufficiently different from other log record, or other parts of the log file). Accordingly, main screen 529 here is shown as including one such anomalous region 545 (within the box defined here, for purposes of illustration, by thick dotted lines). Again, a slider 533 may be used to scroll up or down through the display of main screen 529.

In accordance with at least one embodiment of the invention, in the smaller screen to the right (535), a determined list of reasons for the anomaly may be provided. Should the user decide that the displayed record is anomalous, he/she can select "X" (547) to go back to another boundary pattern candidate; otherwise, he/she may decide that there is no anomaly and may confirm, via button 543, that the candidate represents a proper boundary pattern for separating records within the log file. Similarly to the main screen (FIG. 4), previous and subsequent anomalous regions (with respect to the list in smaller screen 535) can be selected, via buttons 537 and 539, respectively, for further review.

Figure 6:
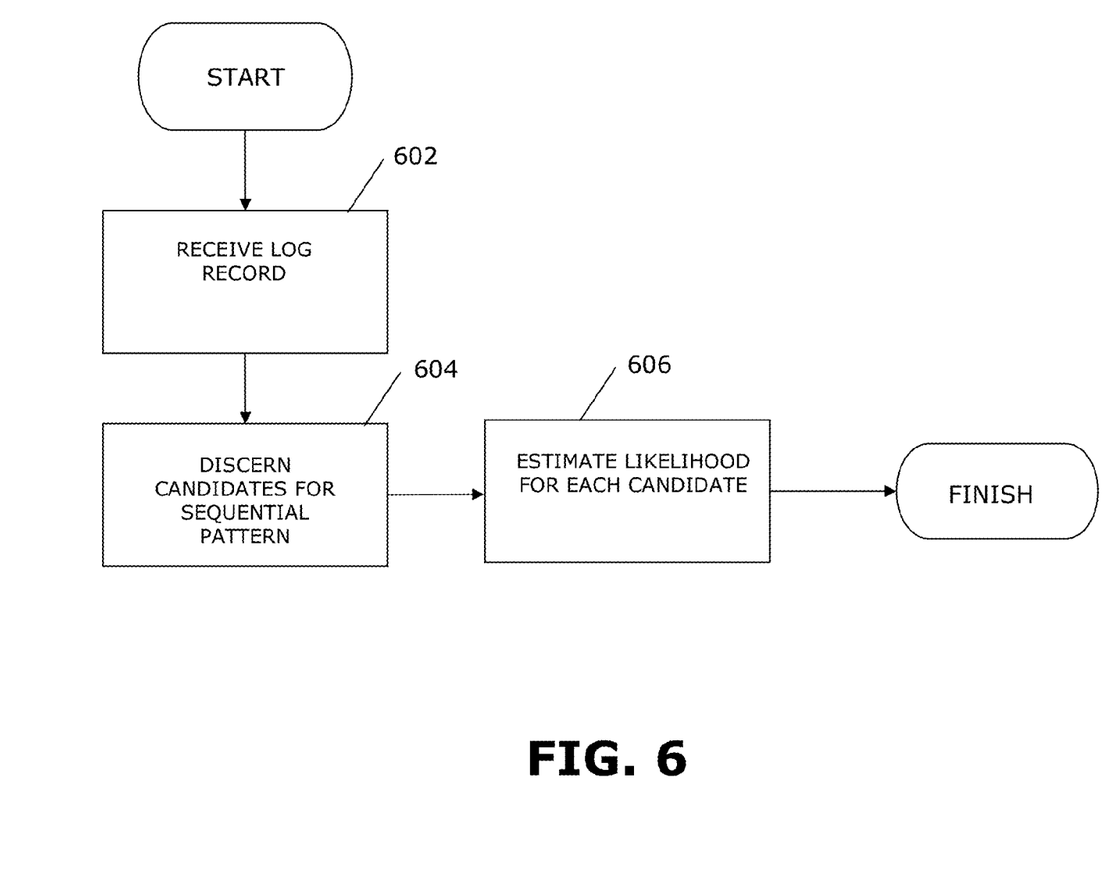
FIG. 6 sets forth a process more generally for segmenting log files.

FIG. 6 sets forth a process more generally for segmenting log files, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, a log file is received (602). Candidates for a sequential pattern within the log file are automatically discerned (604), for each candidate, a likelihood is estimated that it represents a boundary within the log file (606).

Figure 7:
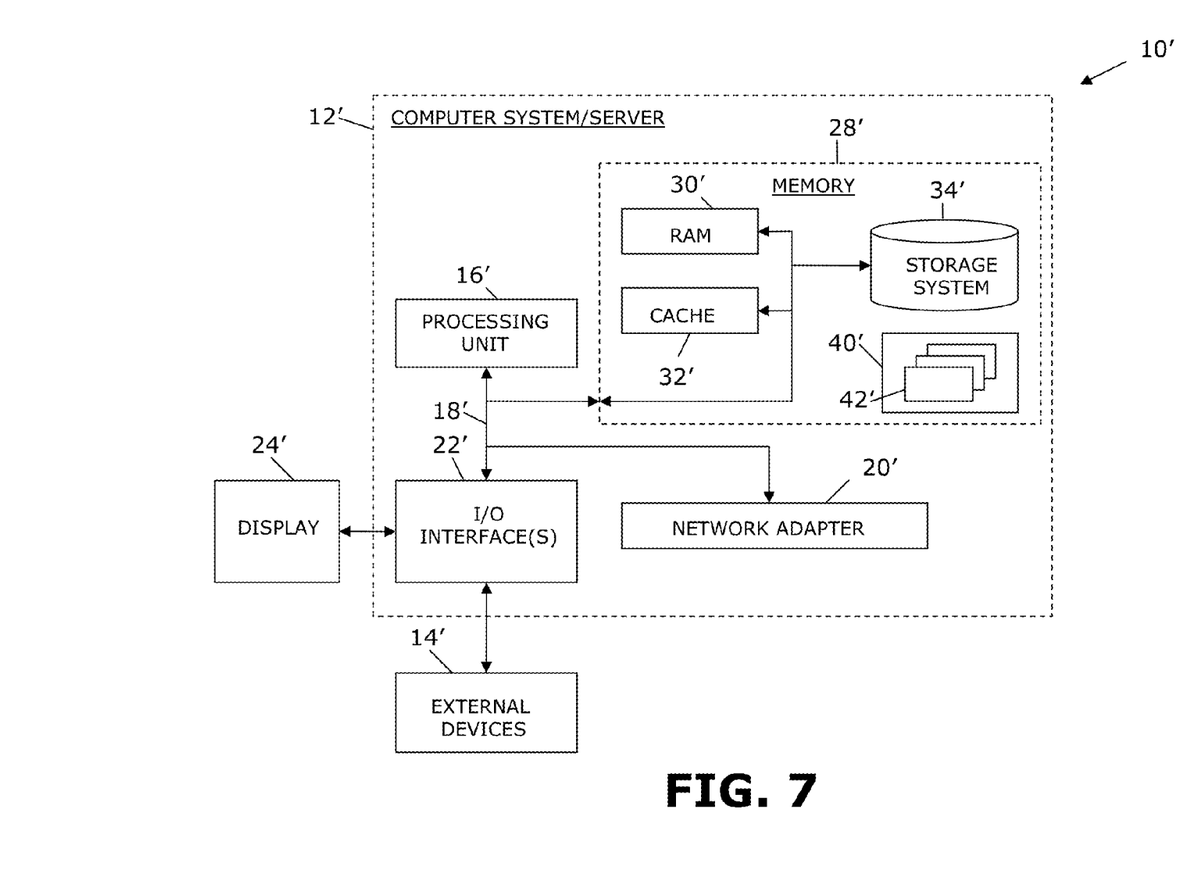
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of segmenting log files, said method comprising:
utilizing at least one processor to execute computer code configured to perform the steps of:
receiving a log file;
generating a plurality of tokens from the log file, wherein a token comprises a term contained within the log file;
generalizing the plurality of tokens, wherein the generalizing comprises replacing a token with a generic annotation corresponding to the token;
identifying a plurality of patterns, wherein each of the plurality of patterns contain a predetermined sequence of generalized tokens;
discerning, using a sequential pattern miner, at least one sequential pattern candidate, wherein each of the at least one sequential pattern candidates comprises a candidate for a boundary pattern;
determining at least one match to the sequential pattern candidate within the log file; and
identifying, based upon the at least one match, a boundary candidate within the log file.

2. The method according to claim 1, comprising ranking the at least one sequential pattern candidate based on an estimated likelihood of a match.

3. The method according to claim 2, comprising choosing the most likely of the at least one sequential pattern candidate via user verification of a match.

4. The method according to claim 3, wherein the user verification of a match is performed via a graphical user interface.

5. The method according to claim 4, comprising displaying on the graphical user interface at least one anomalous portion of at least one sequential pattern candidate.

6. The method according to claim 4, comprising determining the at least one anomalous portion associated with at least one sequential pattern candidate.

7. The method according to claim 1, comprising generating a sequence from the tokens, for review in said discerning of candidates for the at least one sequential pattern.

8. The method according to claim 1, wherein:
the log file comprises a plurality of log records; and
wherein the at least one sequential candidate represents a boundary between log records within the log file.

9. The method of claim 1, wherein the generic annotation comprises an annotation that increases a precision of a sequential pattern candidate.

10. An apparatus for segmenting log records, said apparatus comprising:
at least one processor; and
a computer readable storage medium having computer readable program code embodied therewith and executable by the at least one processor, the computer readable program code comprising:
computer readable program code configured to receive a log record;
computer readable code configured to generate a plurality of tokens from the log file, wherein a token comprises a term contained within the log file;
computer readable code configured to generalize the plurality of tokens, wherein the generalizing comprises replacing a token with a generic annotation corresponding to the token;
computer readable code configured to identify a plurality of patterns, wherein each of the plurality of patterns contain a predetermined sequence of generalized tokens;
computer readable program code configured to discern, using a sequential pattern miner, at least one sequential pattern candidate, wherein each of the at least one sequential pattern candidates comprises a candidate for a boundary pattern;
computer readable program code configured to determine at least one match to the sequential pattern candidate within the log file; and
computer readable program code configured to identify, based upon the at least one match, a boundary candidate within the log file.

11. A computer program product for segmenting log records, said computer program product comprising:
a computer readable storage medium having computer readable program code embodied therewith, the computer readable program code comprising:
computer readable program code configured to receive a log record;
computer readable code configured to generate a plurality of tokens from the log file, wherein a token comprises a term contained within the log file;
computer readable code configured to generalize the plurality of tokens, wherein the generalizing comprises replacing a token with a generic annotation corresponding to the token;
computer readable code configured to identify a plurality of patterns, wherein each of the plurality of patterns contain a predetermined sequence of generalized tokens;
computer readable program code configured to discern, using a sequential pattern miner, at least one sequential pattern candidate, wherein each of the at least one sequential pattern candidates comprises a candidate for a boundary pattern;
computer readable program code configured to determine at least one match to the sequential pattern candidate within the log file; and
computer readable program code configured to identify, based upon the at least one match, a boundary candidate within the log file.

12. The computer program product according to claim 11, comprising computer readable program code configured to rank the at least one sequential candidate based on estimated likelihood of a match.

13. The computer program product according to claim 12, comprising computer readable program code configured to facilitate choosing the most likely of the at least one sequential pattern candidate via user verification of a match.

14. The computer program product according to claim 13, wherein the user verification of a match is performed via a graphical user interface.

15. The computer program product according to claim 14, comprising computer readable program code configured to display on the graphical user interface at least one anomalous portion of at least one sequential pattern candidate.

16. The computer program product according to claim 14, computer readable program code configured to determine the at least one anomalous portion associated with at least one sequential candidate.

17. The computer program product according to claim 11, wherein:
the log file comprises a plurality of log records; and
wherein the at least one sequential candidate represents a boundary between log records within the log file.

18. A method comprising:
utilizing at least one processor to execute computer code configured to perform the steps of:

receiving a log file comprising a plurality of records;
tokenizing at least a portion of the log file to produce a plurality of tokens from the log file, wherein a token comprises a term contained within the log file;
generating a sequence from the tokens;
automatically discerning, using a sequential pattern miner, candidates for a sequential pattern within the log file by matching the generated sequence from the tokens within the log file; and
for each candidate, determining a likelihood that the candidate represents a boundary between log records within the log file, wherein the boundary is an ordered occurrence of the sequential pattern.

\* \* \* \* \*